R. ROEHRICH.
INTERNAL COMBUSTION ENGINE.
APPLICATION FILED DEC. 3, 1913. RENEWED AUG. 12, 1916.
1,211,965. Patented Jan. 9, 1917.
2 SHEETS—SHEET 1.
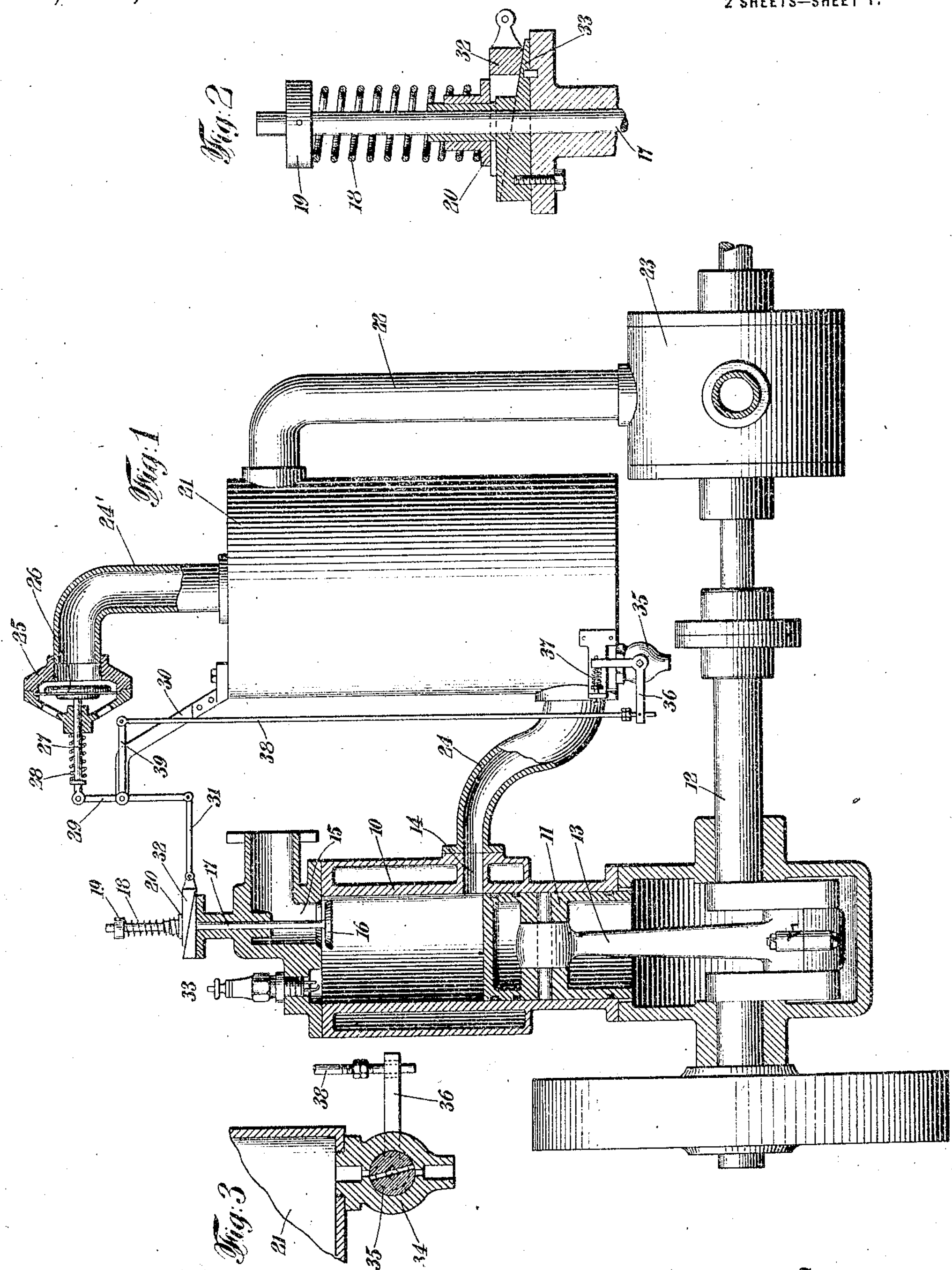
Witnesses.
John E. Prager
M. B. Garvey.
Inventor
Rudolph Roehrich
By his Attorney John R. Nolan R. ROEHRICH.
INTERNAL COMBUSTION ENGINE.
APPLICATION FILED DEC. 3, 1913. RENEWED AUG. 12, 1916.
1,211,965. Patented Jan. 9, 1917.
2 SHEETS—SHEET 2.
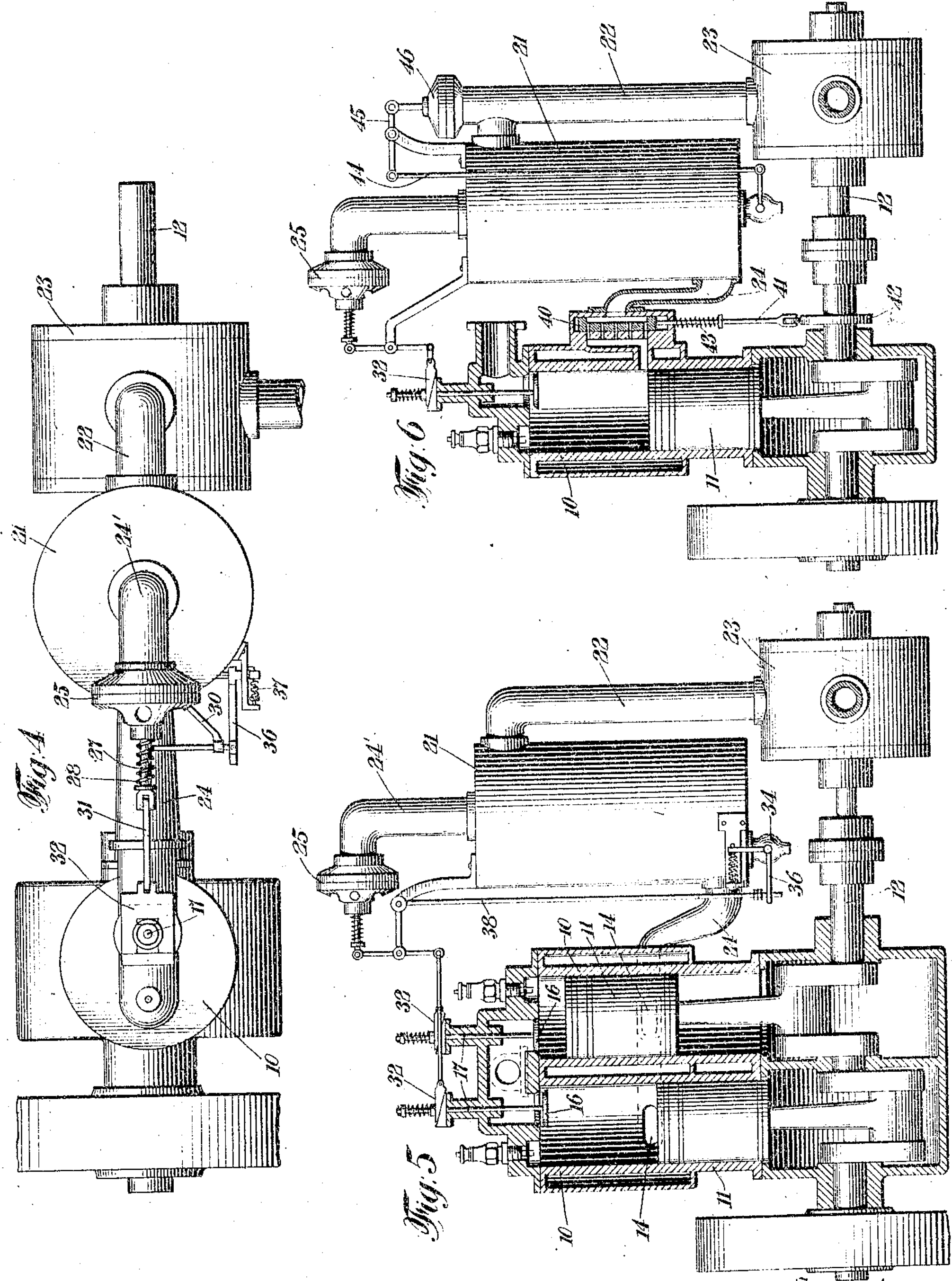
Witnesses:
John E. Prager
M. B. Gourley
Inventor
Rudolph Roehrich
By his Attorney John F. Nolan

UNITED STATES PATENT OFFICE.

RUDOLPH ROEHRICH, OF NEW YORK, N. Y.

INTERNAL-COMBUSTION ENGINE.

1,211,965. Specification of Letters Patent. Patented Jan. 9, 1917.

Application filed December 3, 1913, Serial No. 804,358. Renewed August 12, 1916. Serial No. 114,625.

*To all whom it may concern:*

Be it known that I, Rudolph Roehrich, a citizen of the United States, and resident of New York, in the county and State of New York, have invented certain new and useful Improvements in Internal-Combustion Engines, of which the following is a specification.

This invention relates to internal combustion engines, having reference, more especially, to engines of the two-cycle type.

The object of my invention is to provide an engine of simple construction and operation having relatively increased efficiency for given cylinder capacity. This object I attain by the provision of means whereby the burned gases are effectually removed from the cylinder as rapidly as they are produced, and whereby the operation of the exhaust controls and determines the inflow of the fresh gas to the engine cylinder proportionally to the outflow of the burned gases in a manner to effect and insure a smooth and gradual starting of the engine and also a balanced and steady running thereof, irrespective of the velocity of the engine, whether high or low.

In the present illustrative form of embodiment of my invention the burned gases are exhausted from the engine cylinder through the agency of a vacuum structure, and connections are provided between said structure and the valve of the gas inlet port whereby the pressure in said structure is utilized to adjust the valve and regulate the inflow of fresh gas to the cylinder proportionately to the outflow of the burned gases from the latter, as will be hereinafter described and claimed.

In the drawings Figure 1 is a vertical section, partly in elevation, of a single-cylinder engine embodying my invention. Fig. 2 is a sectional detail of spring-adjusting devices for the valve of the inlet port to the engine cylinder. Fig. 3 is a similar detail of the air-inlet valve for the vacuum chamber. Fig. 4 is a plan of the engine shown in Fig. 1. Fig. 5 is a vertical section, partly in elevation, of a double-cylinder engine embodying my invention. Fig. 6 is a similar view of the single-cylinder engine as equipped with modified valve features.

10 designates the engine cylinder; 11 the piston therein; 12 the crank shaft, and 13 the pitman connection between the piston and shaft.

14 designates the exhaust port. It is located in the wall of the cylinder in position to be opened by the piston as it reaches the limit of its forward or power stroke, and then is closed and maintained closed by the piston as it resumes and continues its return or compression stroke.

15 designates the gas inlet port. It is arranged at the top of the cylinder and is provided with a suitable valve 16 adapted to control the periodical ingress of the explosive charge to the cylinder during the reciprocation of the piston. In the present instance this valve 16 is a puppet valve, the stem 17 of which extends through the valve casing and is held normally raised, to seat the valve, by a spring 18 which, encircling the stem, bears against a collar 19 on the latter and on an opposing collar 20 through which the stem slides. Provision is had for the automatic adjustment of the collar 20 longitudinally of the stem in order to vary the seating force of the spring, as will hereinafter appear.

Adjacent the cylinder is a vacuum cylinder 21 which is operatively connected by means of a pipe 22 with a suitable rotary air-exhaust pump 23 on the crank-shaft. The lower portion of this cylinder 21 is connected by means of a pipe 24 with the exhaust port 14, whereby when the piston approaches the limit of its forward stroke the burned gases are effectually withdrawn from the engine cylinder and discharged through the pump; and at the same time a fresh charge of gaseous mixture is drawn into the engine cylinder through the inlet port.

Leading from the top of the vacuum cylinder 21 is a pipe 24′ provided with a diaphragm casing 25 within which is confined a flexible diaphragm 26 having a central stem 27 which extends outwardly through the casing. This stem is encircled by a spring 28 which, bearing against the casing and a collar on the stem, tends to maintain the diaphragm normally retracted against the excess atmospheric pressure, yet when the difference between the external and internal pressures exceeds a predetermined limit, the diaphragm is moved inward against the pressure of the spring. The stem is pivotally connected with one arm of a rock-lever 29 which is pivoted to a bracket arm 30 projecting from the top of the tank, the other lever-arm being connected by means of a link 31 with a slotted wedge member 32 mounted to slide longitudinally upon a complementary inclined surface 33 on the casing through which the stem of the inlet valve 16 freely projects. The wedge member is thus nicely raised or lowered as it is longitudinally moved forward or back on the opposing inclined surface by the variable pressure upon the diaphragm with which the wedge member is connected. The collar 20 above referred to upon which bears the spring 18 rests upon the wedge member 32 and hence such collar partakes of the adjustments of the latter and accordingly varies the force of the spring.

In the bottom of the vacuum cylinder is a cock 34, the stem of the inlet valve 35 of which is affixed to a crank lever 36. Bearing against one of the lever arms is a suitably-disposed spring 37 which tends normally to maintain the lever 36 in position with the valve closed. The other arm of the lever is connected by means of a link 38 with an arm 39 extending from the pivot pin of the rock-lever 29, and hence when the latter is actuated through the inward movement of the diaphragm as above described the arm and link are raised in a manner to turn the crank lever 36 and thus open the cock for the admission of air to the vacuum chamber. Thereupon the diaphragm resumes its normal condition, and the cock is closed.

From the foregoing described construction it will be seen that in the operation of my improved engine a partial vacuum is established in the cylinder 21; that the piston as it approaches the limit of its forward or power stroke uncovers the exhaust port of the engine cylinder; that thereupon the burned gases are drawn from the engine cylinder into the vacuum chamber and discharged thence through the pump, and that during the removal of the burned gases a fresh charge of explosive gas is introduced to the engine cylinder by way of the inlet port 15 in the top of said cylinder. It will also be seen that the piston in its return or compression stroke immediately closes the exhaust port, and that the pump exhausts the vacuum chamber of the products of combustion delivered thereto. Further, that should there be at any time a too rapid withdrawal of the burned gases, by the action of the pump the diaphragm controlled devices will be automatically operated to increase to a greater or less extent, proportionally to the outflow of the burned gases, the force of the gas-inlet valve spring 18, at the same time opening the valve 35 and permitting the inflow of air to the vacuum chamber.

An important feature of my invention resides in the facility with which the engine may be started preparatory to the efficient exhausting of the air from the vacuum chamber. Normally the pressure of the spring is relatively light and hence the inflow of the fresh gas to the engine cylinder is permitted upon the initial turning or "cranking" of the engine shaft. The withdrawal of the burned gases through the vacuum chamber starts slowly, but as the engine speeds up the vacuum increases; a more rapid withdrawal of the burned gases ensues, and the requisite adjustments of the spring to vary its force and thus determine the inflow of fresh gas to the engine cylinder proportionally to the discharge of the burned gases, are efficiently accomplished.

In Fig. 5, I have illustrated my invention as applied to a two-cylinder engine, wherein as will be observed the exhaust ports 14 of the two cylinders 10 are connected with the pipe 24 leading to the vacuum cylinder 21, and the valves 16 of the inlet ports are each provided with a spring regulating wedge member 32 operatively connected with the diaphragm of the vacuum chamber.

In Fig. 6 is illustrated a single cylinder engine equipped with a supplemental valve for the exhaust, said valve being of the reciprocating grid-type, as 40, having a depending plunger 41 which is maintained in operative contact with a cam 42 on the crank shaft 12 by means of a suitably-disposed compression spring 43. The cock 34 is also illustrated as connected by means of a link 44 and lever 45 with a separate diaphragm structure 46 arranged in the top of the pipe 22 leading from the vacuum chamber to the pump 23, whereby said cock is operated independently of the controlling devices for the gas-inlet valve.

I claim—

1. In an internal combustion engine, a cylinder having inlet and exhaust ports, a piston adapted to reciprocate in the cylinder, a valve for the inlet port, means connected with the exhaust port for withdrawing the burned gases from the cylinder, and regulating devices for the said valve under the influence of the said means.

2. In an internal combustion engine, a cylinder having inlet and exhaust ports, a piston adapted to reciprocate in the cylinder and in its travel to open and close the exhaust port, a valve for the inlet port, a vacuum structure connected with the exhaust port, and regulating devices for said valve under the influence of the pressure in said structure.

3. In an internal combustion engine, a cylinder having inlet and exhaust ports, a piston adapted to reciprocate in the cylinder and in its travel to open and close the exhaust port, a valve for the inlet port, a spring normally seating said valve, a vacuum structure connected with the exhaust port, and regulating devices for the said spring under the influence of the pressure in the vacuum structure.

4. In an internal combustion engine, a cylinder having inlet and exhaust ports, a piston adapted to reciprocate in the cylinder and in its travel to open and close the exhaust port, a valve for the inlet port, a spring normally seating said valve, a vacuum structure connected with the exhaust port, a yielding diaphragm under the influence of the pressure in the said structure, and means connected with said diaphragm for varying the force of the spring.

5. In an internal combustion engine, a cylinder having inlet and exhaust ports, a piston adapted to reciprocate in the cylinder and in its travel to open and close the exhaust port, a valve for the inlet port, a vacuum structure connected with the exhaust port, an air inlet for the vacuum structure, a valve for said air-inlet, and means under the influence of the pressure in said chamber for controlling the air-inlet valve.

6. In an internal combustion engine, a cylinder having inlet and exhaust ports, a piston adapted to reciprocate in the cylinder and in its travel to open and close the exhaust port, a valve for the inlet port, a vacuum structure connected with the exhaust port, an air inlet on the vacuum structure, a valve for said air-inlet, and means under the influence of the pressure in said structure for controlling the operation of said valves.

Signed at New York, in the county and State of New York, this 2d day of December, A. D. 1913.

RUDOLPH ROEHRICH.

Witnesses:
JOHN R. NOLAN,
FRANK N. ROEHRICH.